United States Patent [19]
Murakami

[11] Patent Number: 5,722,089
[45] Date of Patent: Feb. 24, 1998

[54] ANTENNA CONTROL DEVICE FOR A RADIO COMMUNICATION APPARATUS HAVING A PLURALITY OF ANTENNAS

[75] Inventor: Takashi Murakami, Tokyo, Japan

[73] Assignee: NEC Corporation, Japan

[21] Appl. No.: 638,466

[22] Filed: Apr. 26, 1996

Related U.S. Application Data

[63] Continuation of Ser. No. 277,597, Jul. 20, 1994, abandoned.

[30] Foreign Application Priority Data

Jul. 23, 1993 [JP] Japan .................... 5-182588

[51] Int. Cl.$^6$ ................................ H04B 1/38
[52] U.S. Cl. ................ 455/575; 455/277.1; 343/702
[58] Field of Search .................... 455/89, 90, 272, 455/277.1, 280, 575; 343/702, 893, 825; 379/59

[56] References Cited

U.S. PATENT DOCUMENTS

| | | | |
|---|---|---|---|
| 4,208,663 | 6/1980 | Ogita | 455/277.1 |
| 4,958,382 | 9/1990 | Imanishi | 255/273.1 |
| 5,138,329 | 8/1992 | Saarnimo et al. | 343/702 |
| 5,212,725 | 5/1993 | Yamamoto et al. | 455/277.1 |
| 5,261,121 | 11/1993 | Hashimoto | 455/89 |

FOREIGN PATENT DOCUMENTS 0389737  1/1990  European Pat. Off. .

*Primary Examiner*—Edward F. Urban
*Attorney, Agent, or Firm*—Ostrolenk, Faber, Gerb & Soffen, LLP

[57] ABSTRACT

In a portable radio communication apparatus selectively operable with an internal antenna or an external antenna, a control signal is fed to a control signal input terminal when the external antenna is connected to an external antenna terminal. The control signal causes an antenna switch to connect the external antenna to a radio section in place of the internal antenna. A control switch is connected between the control signal input terminal and the antenna switch and turned on when the internal switch is retracted or turn off when it is extended.

5 Claims, 2 Drawing Sheets

5,722,089

ANTENNA CONTROL DEVICE FOR A RADIO COMMUNICATION APPARATUS HAVING A PLURALITY OF ANTENNAS

This is a Continuation of application Ser. No. 08/277,597, filed on Jul. 20, 1994 now abandoned.

BACKGROUND OF THE INVENTION

The present invention relates to a portable radio communication apparatus selectively operable with an internal antenna or an external antenna and, more particularly, to a portable telephone or similar radio communication apparatus capable of using, even when an external antenna is connected thereto, an internal antenna while receiving power from the outside.

A portable telephone or similar portable radio communication apparatus is extensively used and has a retractable antenna or similar internal antenna. Some of this type of apparatuses are designed for use in both a portable mode and an on-board mode. The apparatus operable in such two modes is provided with an antenna switch for selectively connecting the internal antenna or an external antenna to a radio section included in the apparatus. Specifically, in the on-board mode, the antenna switch connects the external antenna, or on-board antenna, to the radio section of the apparatus in response to a control signal fed from the outside of the apparatus. At the same time, power is applied from the outside to the radio section and other sections constituting the apparatus. When the external antenna is not connected to the apparatus, the internal antenna is constantly connected to the radio section since the control signal is absent. In this connection, Japanese Patent Laid-Open Publication No. 63-69302 teaches a portable radio communication apparatus capable of automatically connecting an external antenna to a radio section thereof when the antenna is manipulated, i.e., without resorting to the above-mentioned control signal.

However, the conventional portable radio communication apparatuses have the following problem. Assume that the external antenna is damaged when it is in connection with the radio section. Then, the apparatus cannot be used since the internal antenna is not connected to the radio section. Although the internal antenna may, of course, be connected to the radio section in place of the damaged external antenna, the power supply to the entire apparatus will be shut off.

SUMMARY OF THE INVENTION

It is, therefore, an object of the present invention to provide a portable radio communication apparatus capable of communicating, even when an external antenna is connected thereto, via an internal antenna while receiving power from the outside.

A radio communication apparatus having a radio section of the present invention has an internal antenna, an internal antenna terminal connected to the internal antenna, an external antenna, an external antenna terminal connectable to the external antenna, a control signal input terminal to which a control signal is fed from the outside of the apparatus when the external antenna is connected to the external antenna terminal, an antenna switch for connecting either the internal antenna terminal or the external antenna terminal to the radio section in response to the control signal applied to the control signal input terminal, and a control switch connected between the control signal input terminal and the antenna switch for being turned off when the internal antenna is extended or turned on when it is retracted.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
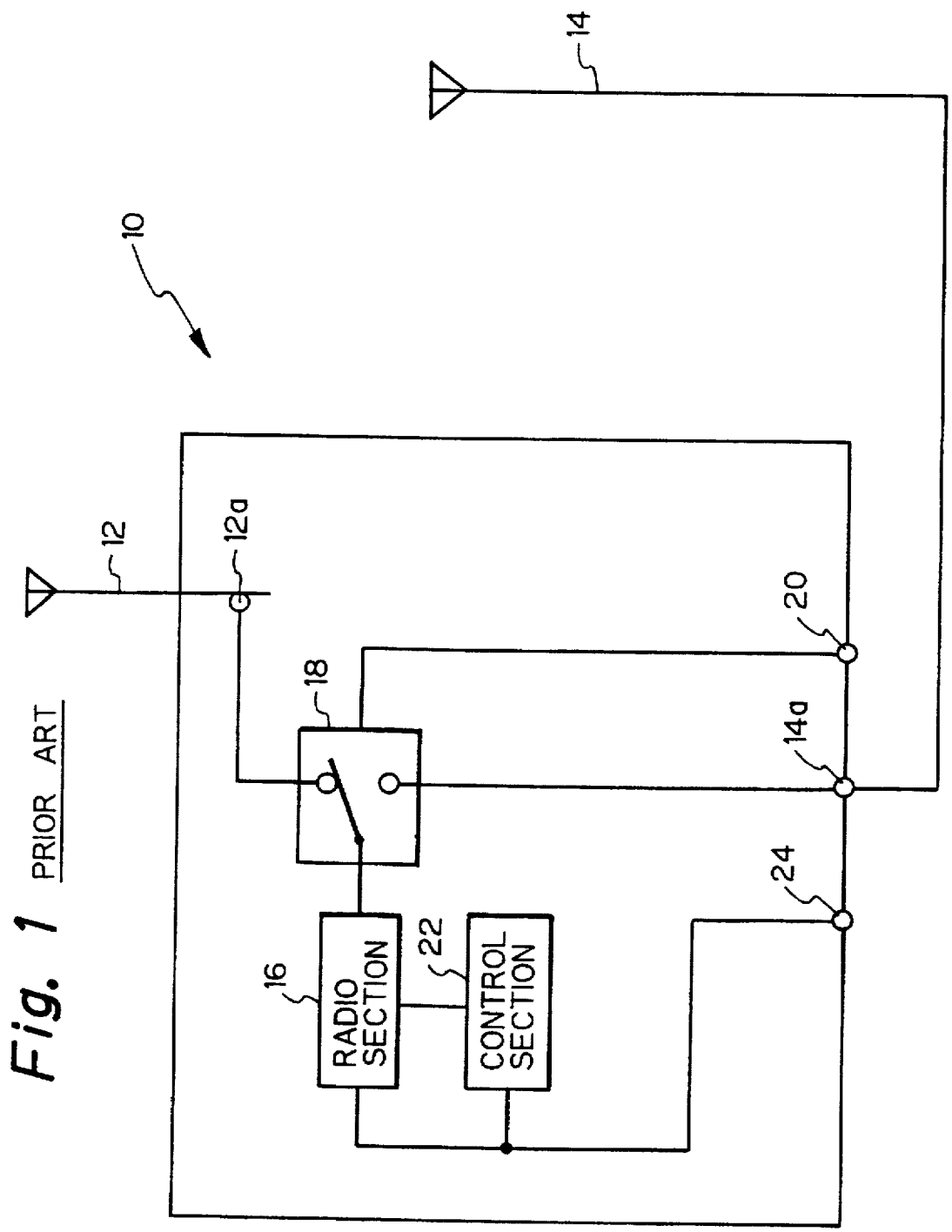
FIG. 1 is a block diagram schematically showing a conventional portable radio communication apparatus.

To better understand the present invention, a brief reference will be made to a conventional portable radio communication apparatus of the type having a switch for switching, when an external antenna is connected to the apparatus, a radio section from an internal antenna to the external antenna. As shown, the apparatus, generally 10, has an internal or retractable antenna 12 and an antenna switch 18. The antenna switch 18 selectively connects a terminal 12a assigned to the retractable antenna 12 or a terminal 14a assigned to an external antenna 14 to a radio section 16. A control signal is fed to the antenna switch 18 via an input terminal while power is applied to the radio section 16 and a control section 22 via a terminal 24. The terminals 14a, 20 and 24 are accommodated in a single connector. A control signal and power are fed to the apparatus 10 via the terminals 14a, 20 and 24 as the same time as the external antenna 14 is connected to the apparatus 10. In this configuration, on the connection of the external antenna 14, a control signal is applied to the antenna switch 18 to cause it to connect the antenna 14 to the radio section 16. Conversely, when the external antenna 14 is not connected to the apparatus 10, the antenna switch 18 maintains the retractable antenna 12 connected to the radio section 16.

The problem with the conventional apparatus 10 is that when the external antenna 14 held in connection with the radio section 16 is damaged, the apparatus 10 cannot be used since the retractable antenna 12 is not connected to the radio section 16.

Figure 2:
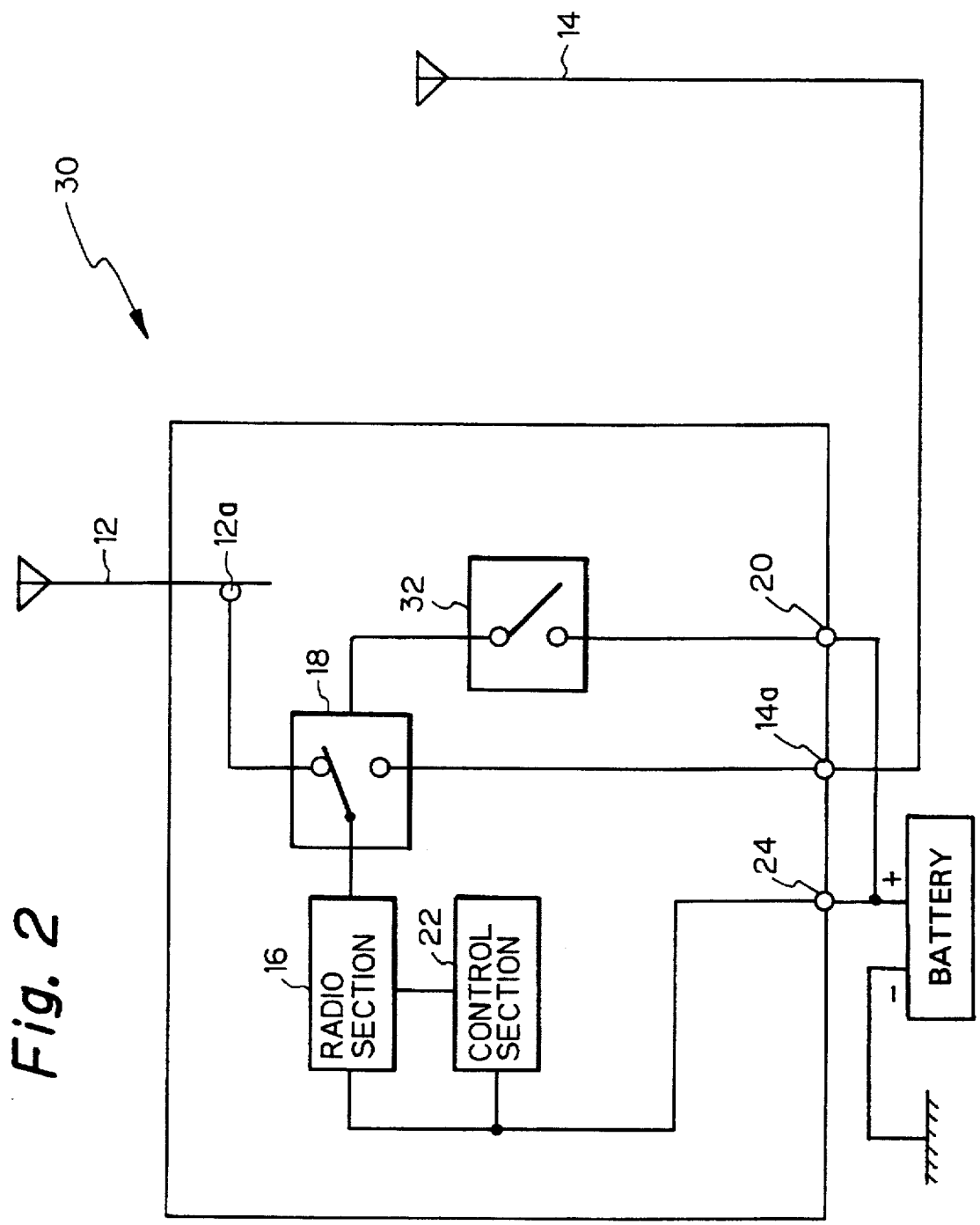
FIG. 2 is a block diagram schematically showing a portable radio communication apparatus embodying the present invention.

Referring to FIG. 2, a portable radio communication apparatus embodying the present invention will be described which is free form the problem stated above. In the figure, the same or similar constituents as or to the constituents of the conventional apparatus 10 are designated by the same reference numerals, and a detailed description thereof will not be made in order to avoid redundancy. As shown, the apparatus, generally 30, has a control switch 32 between a control signal input terminal 20 and an antenna switch 18. When a retractable antenna 12 is retracted into the casing, not shown, of the apparatus 30, the control switch 32 is turned on; when the former is extended out of the casing, the latter is turned off. Specifically, assume that the retractable antenna 12 is retracted into the casing while an external antenna 14 is connected to an external antenna terminal 14a. Then, the control switch 32 is turned on to deliver a control signal to the antenna switch 18, so that the external antenna 14 is brought into connection with a radio section 16. In this condition, when the retractable antenna 12 is extended out of the casing, the control switch 32 is turned off to interrupt the delivery of the control signal to the antenna switch 18. As a result, the antenna switch 18 connects the retractable antenna 12 to the radio section 16.

As stated above, the apparatus 30 is capable of connecting the retractable antenna 12 to the radio section 16 even when the external antenna 14 is in connection with the radio section 16. When the external antenna 14 is not connected to the radio section 16, the retractable antenna 12 is constantly connected to the radio section 16 without the turn-on and turn-off of the control switch 32 effecting the operation of the apparatus 30.

In summary, it will be seen that the present invention provides a portable radio communication apparatus capable of communicating via an internal antenna even when an external antenna is connected thereto. This unprecedented advantage is derived from a control switch selectively feeding, in association with the extended/retracted position of the internal switch, a control signal which selects either the internal antenna or an external antenna.

Various modifications will become possible for those skilled in the art after receiving the teachings of the present disclosure without departing from the scope thereof.

What is claimed is:

1. A radio communication apparatus having a radio section, comprising:

an internal antenna capable of being extended and retracted;

an internal antenna terminal connected to said internal antenna;

an external antenna;

an external antenna terminal connected to said external antenna;

a control signal input terminal for receiving a control signal from outside of said apparatus when said external antenna is connected to said external antenna terminal;

an antenna switch for connecting either said internal antenna terminal or said external antenna terminal to the radio section in response to said control signal applied to said control signal input terminal; and a control switch connected between said control signal input terminal and said antenna switch, said control switch being turned off when said internal antenna is extended or turned on when said internal antenna is retracted, so that to connect said external antenna to said radio section said control signal is applied to said control signal input terminal and said control switch is turned on.

2. An apparatus as claimed in claim 1, further comprising a power supply terminal for receiving power from the outside of said apparatus.

3. An apparatus as claimed in claim 2, wherein said external antenna terminal, said control signal input terminal and said power supply terminal are accommodated in a single connector.

4. An apparatus as claimed in claim 1, wherein said apparatus is a portable radio communication apparatus having a body, and said external antenna is external to said body of said portable radio communication apparatus.

5. A radio communication apparatus having a radio section, comprising:

an internal antenna capable of being extended and retracted;

an internal antenna terminal connected to said internal antenna;

an external antenna terminal for connection to an external antenna;

a control signal input terminal for receiving a control signal from outside of said apparatus when an external antenna is connected to said external antenna terminal;

an antenna switch for connecting either said internal antenna terminal or said external antenna terminal to the radio section in response to said control signal applied to said control signal input terminal; and a control switch connected between said control signal input terminal and said antenna switch, said control switch being turned off when said internal antenna is extended or turned on when said internal antenna is retracted, so that to connect an external antenna to said radio section said control signal is applied to said control signal input terminal and said control switch is turned on.

\* \* \* \* \*